Inventors
MAX WILLIAM BETTS
JACK ALBERT SPICER
Howson and Howson Attorneys

United States Patent Office 3,332,748
Patented July 25, 1967

3,332,748
EXTRACTION OF HOP BITTERS FROM BEER WITH ISO-OCTANE USING SYNCHRONIZED PULSES IN A HELICAL COIL
Max William Betts and Jack Albert Spicer, both of Coventry, England, assignors to Courtaulds Limited, London, England, a company of Great Britain
Filed July 14, 1965, Ser. No. 471,909
Claims priority, application Great Britain, July 20, 1964, 29,472/64
4 Claims. (Cl. 23—312)

ABSTRACT OF THE DISCLOSURE

A process for the extraction of one or more chemical substances, specifically hop bitter substances from a liquid, specifically beer in which a mixture of the liquid and the solvent for the desired chemical substance or substances is fed in synchronised pulses through a horizontally disposed coiled tube and the residual liquid mixture is separated from the solution of the chemical substance or substances in the solvent. The solvent specified is iso-octane and provision is made for the incorporation of a demulsifying agent in the liquid mixture.

---

Figure 2:
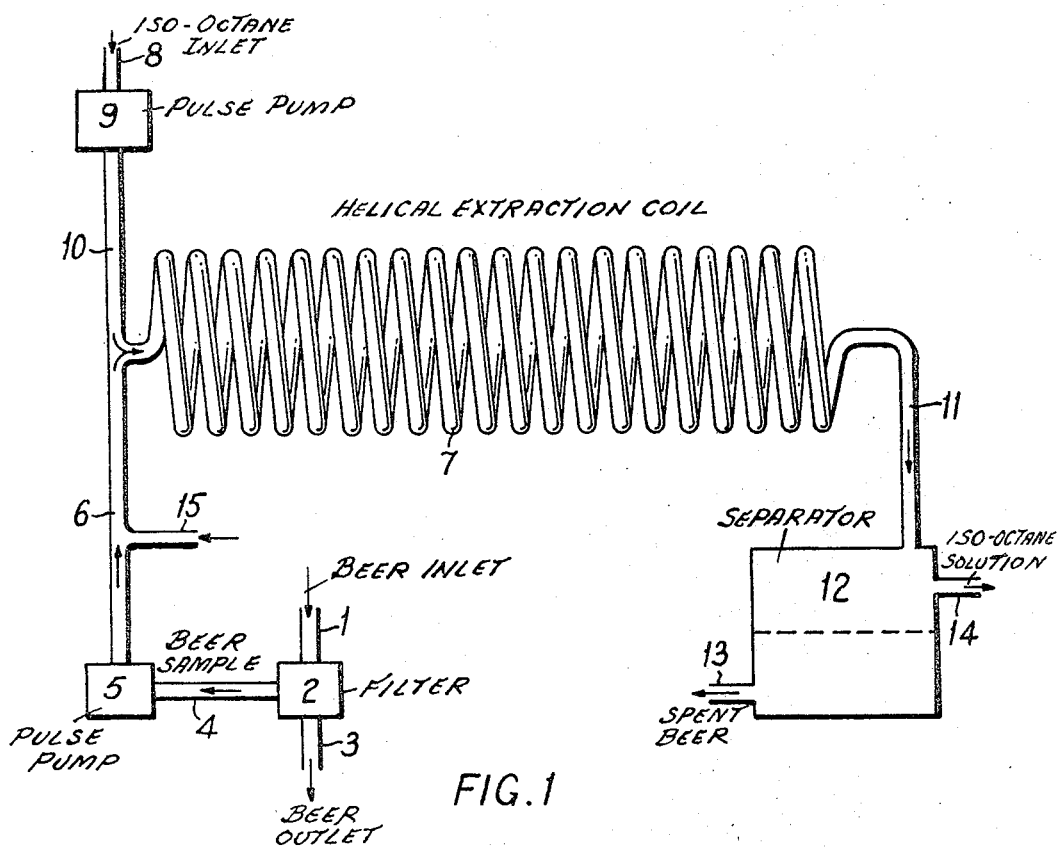

This invention relates to the extraction of chemical substances from liquid mixtures and in particular to the extraction of such substances from complex mixtures for purposes of analysis.

In the analysis of a complex mixture, it may be desired to separate one or more constituents of the mixture, by liquid/liquid extraction methods, in order to obtain a relatively simple solution, for example for spectrographic analysis. Thus, for example, it has been proposed to extract hop bitter substances from brewer's wort or beer by liquid/liquid extraction with iso-octane, whereupon the solution of the hop bitter substances may be analyzed by ultra-violet spectrographic analysis. The present invention provides an extraction process suitable for use in the separation of desired compounds from such mixtures.

According to the invention, a process for the extraction of a chemical substance from a liquid mixture comprises feeding the liquid mixture and a solvent for the desired chemical substance in synchronized pulses through a horizontally disposed coiled tube, and separating the residual liquid mixture from the solution of the desired chemical substance in the solvent. Preferably the coiled tube is helically coiled.

The invention also includes apparatus for carrying out this process.

The solvent may be any solvent for the desired chemical substance which is substantially immiscible with the liquid mixture from which that substance is to be extracted, and should be selected as a solvent which does not extract from the liquid mixture any other substance which will be disadvantageous in the subsequent use of the extracted solution. Thus, known extracting solvents for the removal of specified compounds from liquid mixtures may be used in the process of the present invention. In the extraction of hop bitter substances from brewer's wort or beer, it is preferred to use a hydrocarbon solvent such as iso-octane.

The liquid mixture and the solvent are fed to a horizontally disposed coiled tube in synchronised pulses. The coiled tube is constructed of any suitable material, but it is preferred to use a glass tube to facilitate inspection of the extraction operation. The flow of the liquids through the coiled tube in synchronised pulses may be arranged, for example, by pumping them separately through pulse pumps which are simultaneously energised. An example of such an arrangement is a pair of slave diaphragm heads, which are operated by impulses from the same master pump. The liquids may be fed at substantially identical rates, or one may be fed at a greater rate than the other, according to the solvent used and the extraction rates required. In the extraction of hop bitter substances from beer or brewer's wort, using a hydrocarbon solvent, it is preferred that the solvent be fed at a greater volume rate than the beer or wort, and particularly it is preferred that the volume rate of feed of the hydrocarbon solvent should be at least twice that of the beer or wort. This results in an improvement in extraction efficiency, in more practical optical densities in the solvent extract, and in an economy in the use of the beer or wort.

The diameter of the coiled tube may vary within fairly wide limits, although it must be sufficient to avoid the formation of alternate slugs of liquid mixture and solvent in the coil, under which conditions poor contact results and accordingly poor extraction. For best extraction efficiency, the tube should be not substantially larger in diameter than is required to prevent slug formation under the flow conditions used, although larger sizes can be usefully employed, provided that a more protracted residence time can be tolerated.

In certain cases, it may be necessary to incorporate an additive in the liquid mixture which prevents the formation of an emulsion with the solvent. Thus, in the extraction of hop bitter substances from beer or wort, we have found that it is usually necessary to use such an additive, since the mixed liquids are readily emulsified. A suitable additive has been found to be oleic acid, present in the beer or wort feed in finely divided dispersed particles. This additive may be introduced into the beer or wort feed, for example, by feeding a salt of lauric acid such as one of the alkali metal salts thereof, together with a solution of an acid such as phosphoric acid, into the feed stream of the beer or wort. For certain materials, a salt of oleic acid may be substituted for the salt of lauric acid.

In addition, the extraction of the hop bitter substances from the beer or wort is assisted by acid conditions, and it is preferred to operate the extraction using an aqueous phase having a pH not greater than 2.5.

The mixed liquids are passed through the helical coil tube and the phases are separated in any suitable manner, to obtain an aqueous phase which is substantially free of the desired compound, and a solution of that compound in the solvent which may be subjected to analysis or, if desired, treated for the recovery of the compound therefrom.

In some extraction operations it may be desirable to subject the raffinate to further treatment before analysis. Thus in the extraction of hop bitter substances from heavy beers, such as, for example, stouts, it may be necessary to wash the raffinate with an aqueous acid solution. Preferably a mineral acid such as sulphuric acid or phosphoric acid is employed, and the pH of the solution should be sufficiently low to prevent the extraction of any significant amount of hop bitter substances into the washing solution. Preferably the pH of the solution is not greater than 2.5.

Figure 3:
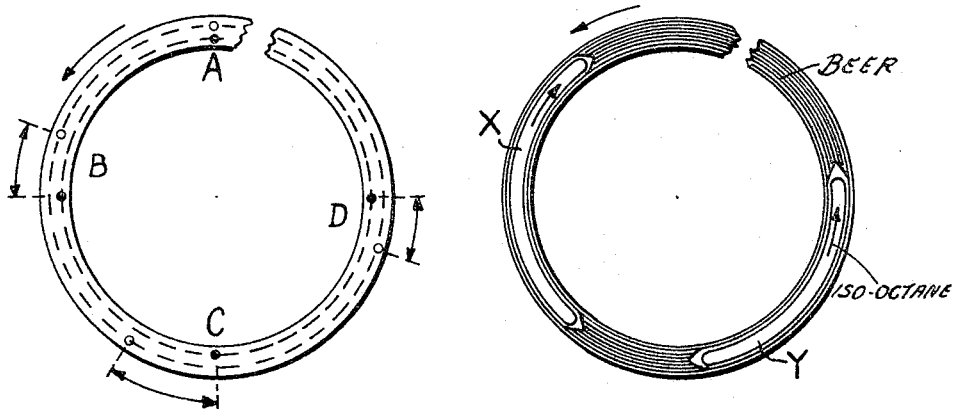

The invention is illustrated by the accompanying drawing, in which:

FIGURE 1 is a diagrammatic representation of an apparatus for carrying out the extraction process of the invention, and FIGURES 2 and 3 illustrate the behaviour of immiscible liquids in a single coil of the coiled tube employed in the invention.

With reference to FIGURE 1 of the drawing, and in a process for the extraction for analysis of hop bitter substances from beer, a feed of beer is passed continuously through a line 1 to a filter 2 whence it is returned to storage through a line 3. A sample of the beer passes through a line 4 to a pulse pump 5 whence it is pumped through a line 6 to the inlet of a horizontally disposed helically coiled tube 7, which is also supplied with a pulsed feed of iso-octane which is fed from a line 8 by a pulse pump 9 to a line 10 whence it passes to the tube 7. The pulse pumps 5 and 9 are synchronously operated by impulses from a master pump (not shown). After passage through the helically coiled tube 7, the mixed liquids pass through a line 11 to a separator 12 from which the spent beer is removed to waste by a line 13 and the solution of hop bitter substances in iso-octane is taken off from a line 14 for analysis. Additives, such as acid solution and demulsifying agent are added as necessary through a line 15 by means of one or more further synchronised pulse pumps (not shown).

In FIGURE 2, the black and white circles represent notional points in the beer and iso-octane respectively within one coil of the helical tube, flow being in the direction of the single-headed arrow. At position A both notional points are together, and after a pulse from the pump both notional points move to position B, but between this pulse and the next, the lighter iso-octane moves upwardly relative to the beer, and the notional point in the iso-octane lags behind that in the beer as shown at B. Similarly, after the next pulse, a further lag occurs as shown at C. During the next following intermission between pulses, however, the relative movement of the iso-octane is in the direction of flow, and the lag is reduced as shown at D. Thus a considerable degree of relative movement occurs between the liquids, and this with the turbulence induced by the flow pulses, leads to an efficient liquid/liquid extraction.

FIGURE 3 shows the direction of movement of the iso-octane globules X and Y within the beer M during an intermission between two pulses.

While the invention has been specifically described with reference to a process for the removal of hop bitter substances from beer, it will be appreciated that the process of the invention may be applied in the extraction of substantially any liquid mixture with substantially any suitable solvent.

We claim:
1. The process for the extraction of hop bitters from its solution in beer by solvent extraction which comprises feeding the beer and iso-octane in synchonised pulses along a horizontally disposed helical path and separating the residual beer from the solution of the hop bitters in the iso-octane.

2. The process as claimed in claim 1 in which an additive selected from the group consisting of lauric acid and oleic acid is incorporated in the beer to prevent formation of an emulsion with the solvent.

3. The process as claimed in claim 1 in which the extraction is carried out at a pH in the aqueous phase which is not greater than 2.5.

4. The process as claimed in claim 1 in which the solution of the hop bitters in iso-octane, after separation from the beer, is washed with an aqueous acid solution of pH not greater than 2.5.

References Cited

UNITED STATES PATENTS

| | | | |
|---|---|---|---|
| 2,967,764 | 1/1961 | Skeggs | 23—309 X |
| 3,109,713 | 11/1963 | Ferrari | 23—253 |
| 3,199,956 | 8/1965 | Ferrari | 23—267 |
| 3,204,934 | 9/1965 | Graham | 23—267 X |
| 3,211,530 | 10/1965 | Harvey | 23—253 |

FOREIGN PATENTS

| | | |
|---|---|---|
| 928,672 | 6/1963 | Great Britain. |
| 1,330,526 | 5/1963 | France. |

OTHER REFERENCES

Long et al.: Industrial and Engineering Chemistry, vol. 53, No. 10, October 1961, pages 791 to 798.

NORMAN YUDKOFF, *Primary Examiner.*

S. EMERY, *Assistant Examiner.*